US010373283B2

(12) United States Patent
Ragupathi et al.

(10) Patent No.: US 10,373,283 B2
(45) Date of Patent: Aug. 6, 2019

(54) SYSTEM AND METHOD FOR NORMALIZATION OF GPU WORKLOADS BASED ON REAL-TIME GPU DATA

(71) Applicant: DELL PRODUCTS, LP, Round Rock, TX (US)

(72) Inventors: Dinesh Kunnathur Ragupathi, Round Rock, TX (US); John R. Palmer, Georgetown, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 15/069,516

(22) Filed: Mar. 14, 2016

(65) Prior Publication Data

US 2017/0262953 A1  Sep. 14, 2017

(51) Int. Cl.
*G06F 15/16* (2006.01)
*G06T 1/20* (2006.01)

(52) U.S. Cl.
CPC ............ *G06T 1/20* (2013.01); *G06T 2200/28* (2013.01)

(58) Field of Classification Search
CPC ...... G06F 1/206; G06F 1/3203; G06F 1/3206; G06F 1/3287; G06F 1/3234; G06F 11/3409; G06F 1/32; G06F 9/50; G09G 5/363; G09G 2330/021
See application file for complete search history.

(56) References Cited

U.S. PATENT DOCUMENTS

| | | |
|---|---|---|
| 5,335,985 A | 8/1994 | Baur |
| 5,434,775 A | 7/1995 | Sims et al. |
| 5,505,533 A | 4/1996 | Kammersgard et al. |
| 5,774,668 A | 6/1998 | Choquier et al. |
| 5,805,442 A | 9/1998 | Crater et al. |
| 5,869,820 A | 2/1999 | Chen et al. |
| 5,910,776 A | 6/1999 | Black |
| 5,913,034 A | 6/1999 | Malcolm |
| 5,926,463 A | 7/1999 | Ahearn et al. |
| 5,956,665 A | 9/1999 | Martinez et al. |
| 5,956,723 A | 9/1999 | Zhu |
| 5,959,012 A | 9/1999 | Simonian et al. |
| 6,057,981 A | 5/2000 | Fish et al. |
| 6,112,246 A | 8/2000 | Horbal et al. |
| 6,131,119 A | 10/2000 | Fukui |
| 6,167,448 A | 12/2000 | Hemphill et al. |
| 6,282,175 B1 | 8/2001 | Steele et al. |
| 6,601,084 B1 | 7/2003 | Bhaskaran et al. |
| 6,654,347 B1 | 11/2003 | Wiedeman et al. |
| 6,714,977 B1 | 3/2004 | Fowler et al. |
| 6,826,714 B2 | 11/2004 | Coffey et al. |
| 7,450,636 B2 | 11/2008 | Lee et al. |

(Continued)

*Primary Examiner* — Hau H Nguyen
(74) *Attorney, Agent, or Firm* — Larson Newman, LLP

(57) ABSTRACT

An information handling system includes a host processing system and a management controller. The host processing system includes a main processor that instantiates a management controller agent, a graphics processing unit (GPU), and a GPU throttle module. The management controller accesses the management controller via a first interface to obtain a performance status from the GPU, determine that the performance status is outside of a status threshold, and direct, via a second interface of the information handling system, the GPU throttle module to throttle the GPU to bring the performance status to within the status threshold.

20 Claims, 4 Drawing Sheets

(56) References Cited

U.S. PATENT DOCUMENTS

| | | |
|---|---|---|
| 7,696,506 B2 | 4/2010 | Lung |
| 7,720,987 B2 | 5/2010 | Penk et al. |
| 8,031,763 B2 | 10/2011 | Sumesaglam |
| 8,037,330 B2 | 10/2011 | Livescu et al. |
| 8,397,087 B1 * | 3/2013 | Gardner .................. G06F 1/329 713/300 |
| 8,588,288 B2 | 11/2013 | Witt |
| 8,732,508 B2 | 5/2014 | Cochran et al. |
| 9,105,249 B2 * | 8/2015 | Samson .................... G09G 5/18 |
| 2002/0095487 A1 | 7/2002 | Day et al. |
| 2002/0141210 A1 | 10/2002 | Glannopoulos et al. |
| 2003/0046339 A1 | 3/2003 | Ip |
| 2004/0010649 A1 | 1/2004 | Weaver et al. |
| 2004/0013188 A1 | 1/2004 | Toniello et al. |
| 2006/0182172 A1 | 8/2006 | Lin |
| 2007/0094426 A1 | 4/2007 | Chiang et al. |
| 2008/0304557 A1 | 12/2008 | Hollis |
| 2008/0317021 A1 | 12/2008 | Ives et al. |
| 2009/0189774 A1 | 7/2009 | Brundridge et al. |
| 2009/0217073 A1 | 8/2009 | Brech et al. |
| 2009/0307515 A1 | 12/2009 | Bandholz et al. |
| 2010/0027687 A1 | 2/2010 | De Natale et al. |
| 2010/0106154 A1 | 4/2010 | Harley et al. |
| 2011/0022245 A1 | 7/2011 | Goodrum et al. |
| 2011/0179301 A1 | 7/2011 | Liu et al. |
| 2012/0170638 A1 | 7/2012 | Chen |
| 2012/0262956 A1 | 10/2012 | DeHaven |
| 2012/0303767 A1 | 11/2012 | Renzin |
| 2013/0007249 A1 | 1/2013 | Wang et al. |
| 2013/0169314 A1 | 7/2013 | Choudhary et al. |
| 2013/0232357 A1 * | 9/2013 | Nagata .................... G06F 1/324 713/322 |
| 2014/0269881 A1 | 9/2014 | He et al. |
| 2014/0312953 A1 | 10/2014 | Song |
| 2015/0348226 A1 * | 12/2015 | Vaishampayan ........ G06F 1/206 345/503 |

* cited by examiner

US 10,373,283 B2

SYSTEM AND METHOD FOR NORMALIZATION OF GPU WORKLOADS BASED ON REAL-TIME GPU DATA

CROSS REFERENCE TO RELATED APPLICATIONS

Related subject matter is contained in co-pending U.S. patent application Ser. No. 14/955,977 entitled "System and Method for Managing Workloads and Hot-Swapping a Co-Processor of an Information Handling System," filed on Dec. 1, 2015, the disclosure of which is hereby incorporated by reference.

FIELD OF THE DISCLOSURE

This disclosure generally relates to information handling systems, and more particularly relates to normalization of GPU workloads based on real-time GPU data.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. The use of the same reference symbols in different drawings indicates similar or identical items. Embodiments incorporating teachings of the present disclosure are shown and described with respect to the drawings presented herein, in which.

SUMMARY

An information handling system can include a host processing system and a management controller. The host processing system can include a main processor that instantiates a management controller agent, a graphics processing unit (GPU), and a GPU throttle module. The management controller can access the management controller via a first interface to obtain a performance status from the GPU, determine that the performance status is outside of a status threshold, and direct, via a second interface of the information handling system, the GPU throttle module to throttle the GPU to bring the performance status to within the status threshold.

In throttling the GPU, the GPU throttle module can assert a control signal to the GPU. The control signal can cause the GPU to slow its operation. The GPU can slow its operation by reducing an internal clock frequency of the GPU. The GPU throttle module can assert the control signal in accordance with a pulse width modulation scheme. The GPU can slow its operation in proportion with a pulse width of the control signal. The performance status can include a temperature of the GPU, a power consumption of the GPU, a memory utilization of the GPU, or an I/O bandwidth utilization of the GPU.

DETAILED DESCRIPTION OF DRAWINGS

The following description in combination with the Figures is provided to assist in understanding the teachings disclosed herein, and will focus on specific implementations and embodiments of the teachings. This focus is provided to assist in describing the teachings, and should not be interpreted as limiting the scope or applicability of the teachings. Moreover, other teachings can be used along with the teachings of this disclosure, and the teachings of this disclosure can be used along with other disclosures.

Figure 1:
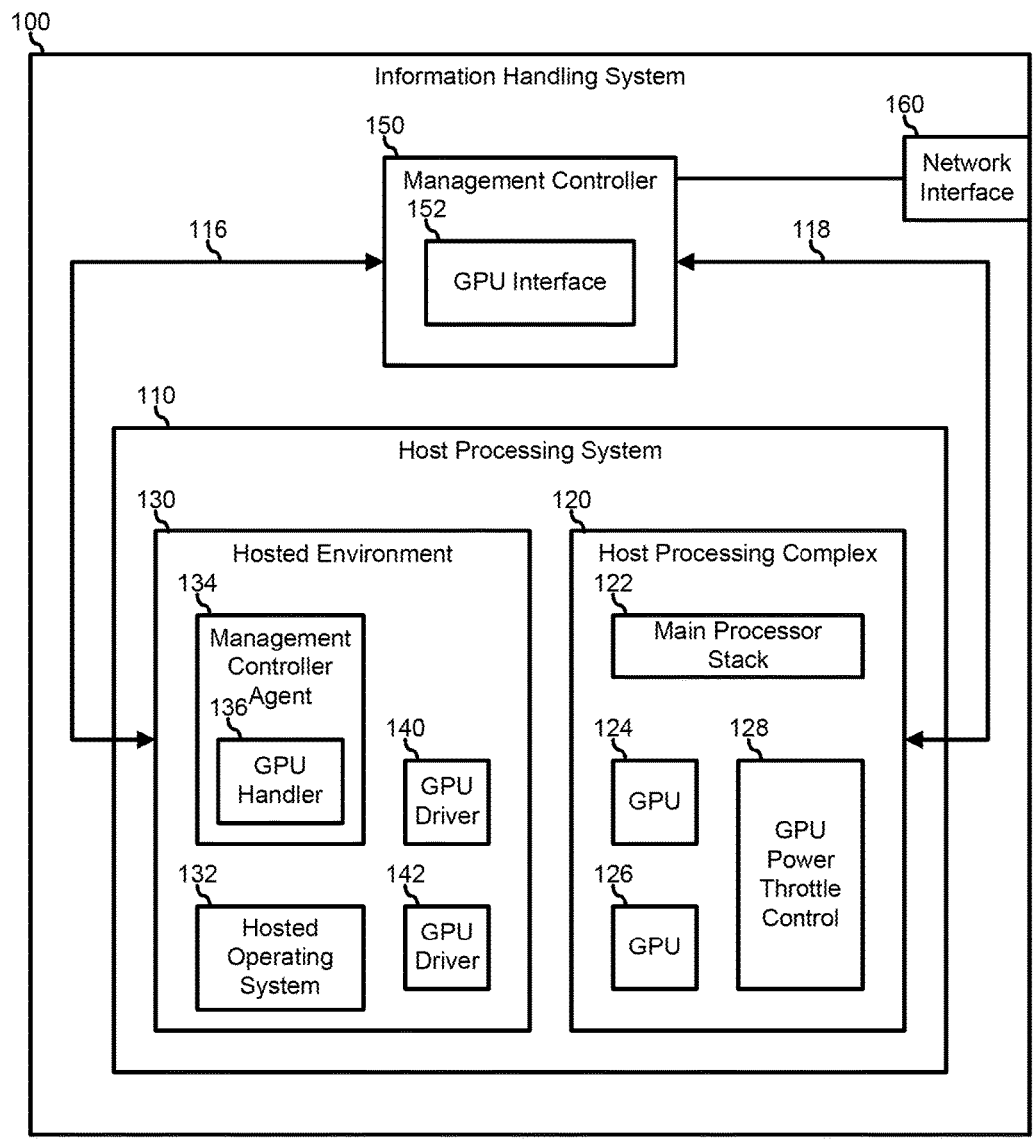
FIG. 1 is a block diagram of an information handling system according to an embodiment of the present disclosure.

FIG. 1 illustrates an information handling system 100 including a host processing system 110, a management controller 150, and a network interface 160. Host processing system 110 includes a host processing complex 120 and a hosted environment 130. Host processing complex 120 represents the main processing elements of information handling system 100, including a main processor stack 122, general-purpose processing units (GPUs) 124 and 126, and a GPU power throttle control module 128. Main processor stack 122 represents one or more processors, chipset elements, storage devices, memory devices, I/O devices, and the like. GPUs 124 and 126 represent processing resources of host processing complex 120 that can be utilized to offload main processor stack 122 from various functions as needed or desired. An example of GPUs 124 and 126 include graphics co-processors, encoding co-processors, or media co-processors, and the like, such as various processing devices as my be supplied by different vendors or manufacturers. In a particular embodiment, GPUs 124 and 126 represent a particular architecture that utilizes graphics co-processors to offload various compute intensive tasks and services from main processor stack 122.

GPU power throttle control module 128 operates to provide various mechanisms to provide a hardware slow-down of one or more of GPUs 124 and 126. Here, GPUs 124 and 126 each include a vendor specific mechanism for initiating a hardware slowdown of the GPUs. In particular, GPUs 124 and 126 each include one or more signal connections which, when asserted, cause the GPUs to slow their operation. For example, a GPU manufactured by Advanced Micro Devices can include an "E-Brake" connection, a GPU manufactured by nVidia can include a "Power-Brake" connection, a GPU manufactured by Intel can include a "GPU-Hot" connection, or another GPU manufactured by another manufacturer can include another vendor specific connection. The mechanism by which a particular GPU is slowed down may be vendor specific, but can include a mechanism to internally reduce a clock speed provided to the internal circuitry of the specific GPU. For example, a particular GPU manufacturer my implement a power reduction mechanism whereby, upon assertion of the signal associated with the specific connection, the internal clock rate of the GPU is reduced to one-half of the clock rate provided to the GPU by the host system. For the purpose of this disclosure, the various vendor specific mechanisms will be referred to collectively as the power brake mechanism, and the signal associated with the various mechanisms will be referred to as the power brake signal.

In a particular embodiment, GPU power throttle control module 128 operates to assert the power brake signal to one or more of GPUs 124 and 126 using a pulse width modulation scheme to slow down the associated GPUs by a desired amount, up to the limit of the particular GPU. For example, consider a power brake mechanism for a particular GPU that operates to reduce the internal clock speed by one-half of the clock rate provided to the GPU by the host system. Here, the operating rate will be give as:

$$\text{Operating Rate}=50+(100-\text{Pulse Width Percentage})/2 \quad \text{Equation 1}$$

Thus, a 0% duty cycle for the assertion of the power brake signal will result in the GPU operating without throttling (100%), and a 100% duty cycle for the assertion of the power brake signal will result in the GPU operating at a 50% rate.

Hosted environment 130 includes a hosted OS 132, a management controller agent 134, and GPU drivers 140 and 142. Hosted environment 130 represents a processing environment instantiated on host processing complex 120, and can include a BIOS or UEFI for information handling system 100, other firmware, device drivers, and the like, that establish the core operating code for establishing the hosted environment, and to launch hosted OS 132 on the host processing complex. Hosted OS 132 operates to manage the runtime aspects of hosted environment 130, to launch programs and applications on host processing complex 120, and to launch, manage, maintain, and halt workloads on GPUs 124 and 126. GPU drivers 140 and 142 operate to control GPUs 124 and 126, and to provide an interface to enable hosted. OS 132 and other components of hosted environment 130 to access the GPUs. In a particular embodiment, one or more of GPUs 124 and 126 include vendor specific functions and features for configuring, monitoring, and controlling the GPUs. Such vendor specific functions and features are accessible to hosted environment 130 via GPU drivers 140 and 142. In particular, one or more of GPUs 124 and 126 may include monitoring functions and features that relate to the operating conditions experienced by the GPUs in real time. For example, one or more of GPUs 124 and 126 may include monitoring features that provide information to respective GPU drivers 140 and 142 that relates to power utilization, operating temperature, processing core utilization, memory utilization, memory and I/O bandwidth, or other features, as needed or desired. Note that GPU drivers 140 and 142 operate in-band with the operations of hosted environment 130.

Management controller 150 is connected via an interface 116 to interact with various functions and features of hosted environment 130, and is connected via an out-of-band interface 118 to interact with various functions and features of host processing complex 120. In particular, management controller 150 interacts with the various functions and features of hosted environment 130 via a management system agent 134 that is instantiated in the hosted environment to permit a user connected to the management controller to obtain status information from the pre-boot and runtime elements of the hosted environment, including the programs and applications instantiated in the hosted environment. The user can also provide commands and otherwise control the operations of the programs and applications, including directing hosted OS 132 to launch a program, application, or workload, to modify the runtime operation of a program, application, or workload, and to halt the execution of a program, application, or workload, as needed or desired. Interface 116 represents a communication path between hosted environment 130 and management controller 150, as is known in the art, and can include a keyboard controller style (KCS) interface, a USB-NIC interface, an OS-to-BMC pass-through interface, or the like.

Management controller 150 includes a GPU interface module 152 that interacts with the various in-band functions and features of GPU drivers 140 and 142 via a GPU handler module 136 of management system agent 134 to permit the user to obtain status information from the workloads instantiated on GPUs 124 and 126, and to access the in-band monitoring features of the GPUs. GPU interface module 152, interacting with GPU handler module 136 also permits the user to provide commands and otherwise control the operations of GPUs 124 and 126 or to manage the workloads running on the GPUs, including directing hosted OS 132 to launch a workload, to modify the runtime operation of a workload, and to halt the execution of a workload, as needed or desired.

Management controller 150 also interacts out-of-band with the various functions and features of host processing complex 120, and particularly of main processing stack 122. For example, management controller 150 can receive status information from main processor stack 122, such as processor loading information, I/O bandwidth utilization information, memory capacity and utilization information, and the like. Management controller 150 also provides commands and otherwise controls the operations of the elements of information handling system 100, such as by changing an operating voltage or an operating frequency of main processor stack 122.

GPU interface module 152 further interacts out-of-band with GPUs 124 and 126 and with GPU power throttle control module 128. For example, GPU interface module 152 can receive out-of-band status information from GPUs 124 and 126, such as operating temperatures, supply voltage levels, applied clock frequencies, cooling fan speeds, and the like. GPU interface module 152 can receive other status information from GPUs 124 and 126, including power utilization, operating temperature, processing core utilization, memory utilization, memory and I/O bandwidth, or other features, and the like. Note that the status information that is available from GPUs 124 and 126 via out-of-band interface 118 may be the same as, or different from the status information that is available from GPU drivers 140 and 142, as may be determined by the particular GPU vendor, or as otherwise dictated by design related choices, as needed or desired. GPU interface module 152 also provides commands and otherwise controls the operations of GPUs 124 and 126, such as by changing an operating voltage or an operating frequency of one or more of the GPUs. In addition, GPU interface module 152 operates to direct GPU power throttle control module 128 to throttle the operation of one or more of GPUs 124 and 126, as described above.

GPU interface module 152 provides a management interface that permits a user that is connected to management controller 150 via network interface 160 to select one or more of GPUs 124 and 126, and to view the current operating status of the selected GPU, such as by identifying the workload currently being run on the selected GPU, presenting the current processing load condition, I/O bandwidth, memory usage, or the like, or by otherwise displaying information related to the status of the selected GPU. Here, GPU interface module 152 directs GPU handler module 136 to retrieve the requested information from hosted environment 130, from hosted OS 132, or directly retrieves the requested information from the selected one of GPUs 124 and 126 via out-of-band interface 118. GPU interface module 152 then provides the retrieved information to the user.

The management interface provided by GPU interface module 152 further permits the user to obtain real time in-band status information from GPU handler module 136. Then GPU interface module 152 operates to provide compare the status information for GPU 124 with the status information for GPU 126. In a particular embodiment, GPU interface module 152 includes vendor supplied information for GPUs 124 and 126 that is related to the status information, such as maximum temperature ratings, peak I/O and memory bandwidths, optimum memory and processor utilization levels, and the like. Here, GPU interface module 152 can provide the current status information to the user as proportions or percentages of the associated vendor supplied limits. For example, if GPU 124 has a maximum power consumption of 100 watts and is currently utilizing 75 watts, GPU interface module 152 can show that GPU 124 is currently operating at 75%, and if GPU 126 has a maximum power consumption of 150 watts and is currently utilizing 135 watts, the GPU interface module can show that GPU 126 is currently operating at 90%. Moreover, by displaying the current utilization for both of GPUs 124 and 126, for example, in a side-by-side fashion, the user can easily see the relative loading for each GPU. Similar comparisons can be made for other status metrics, such as operating temperature, memory utilization, memory and I/O bandwidth, and the like. Moreover, comparisons can be made using a first metric for GPU 124 and a different metric for GPU 126. For example, a side-by-side comparison can be made of the current GPU loading for GPU 124 versus the current power consumption for GPU 126.

Utilizing the comparison information, a user can optimize schemes for executing various workloads on GPUs 124 and 126. For example, a user can access the management interface provided by GPU interface module 152 to direct GPU handler module 136 to launch a particular workload on both of GPUs 124 and 126, and compare the operational efficiency of the workloads on the different GPUs. For example, using the values from above, where GPU 124 has a maximum power consumption of 100 watts and GPU 126 has a maximum power consumption of 150 watts, a particular workload may operate at 95 watts (95%) while running 100% GPU utilization on GPU 124, and at 105 watts (70%) while running 50% GPU utilization on GPU 106. Here, the user can make a determination to run the workload on GPU 124 when power consumption is the primary consideration, or to run the workload on GPU 126 when GPU utilization is the primary consideration.

The management interface provided by GPU interface module 152 further permits the user to set limits on the various status matrices, as needed or desired. Here, when a limit is exceeded or otherwise violated, GPU interface module 152 directs GPU power throttle control module 128 to throttle one or more of GPUs 124 and 126. For example, where temperature of a data center is a key consideration or limiting factor, the user can set a maximum temperature per GPU 124 and 126. Then, if one or more of GPUs 124 and 126 exceed the maximum temperature, GPU interface module 152 can direct GPU power throttle control module 128 to throttle the affected GPU. In another example, a workload can be instantiated across both of GPUs 124 and 126, such that GPU 124 performs a first function on received data and GPU 126 performs a second function on the data from the first GPU. Here, GPU 124 may be operating at a 50% I/O bandwidth utilization, while GPU 126 may be operating at a 100% I/O bandwidth utilization. In this case, it may be desirable to throttle GPU 124 to a point where the I/O bandwidth of both GPUs are more equally matched, thereby also reducing the power consumed by the GPU 124.

Figure 2:
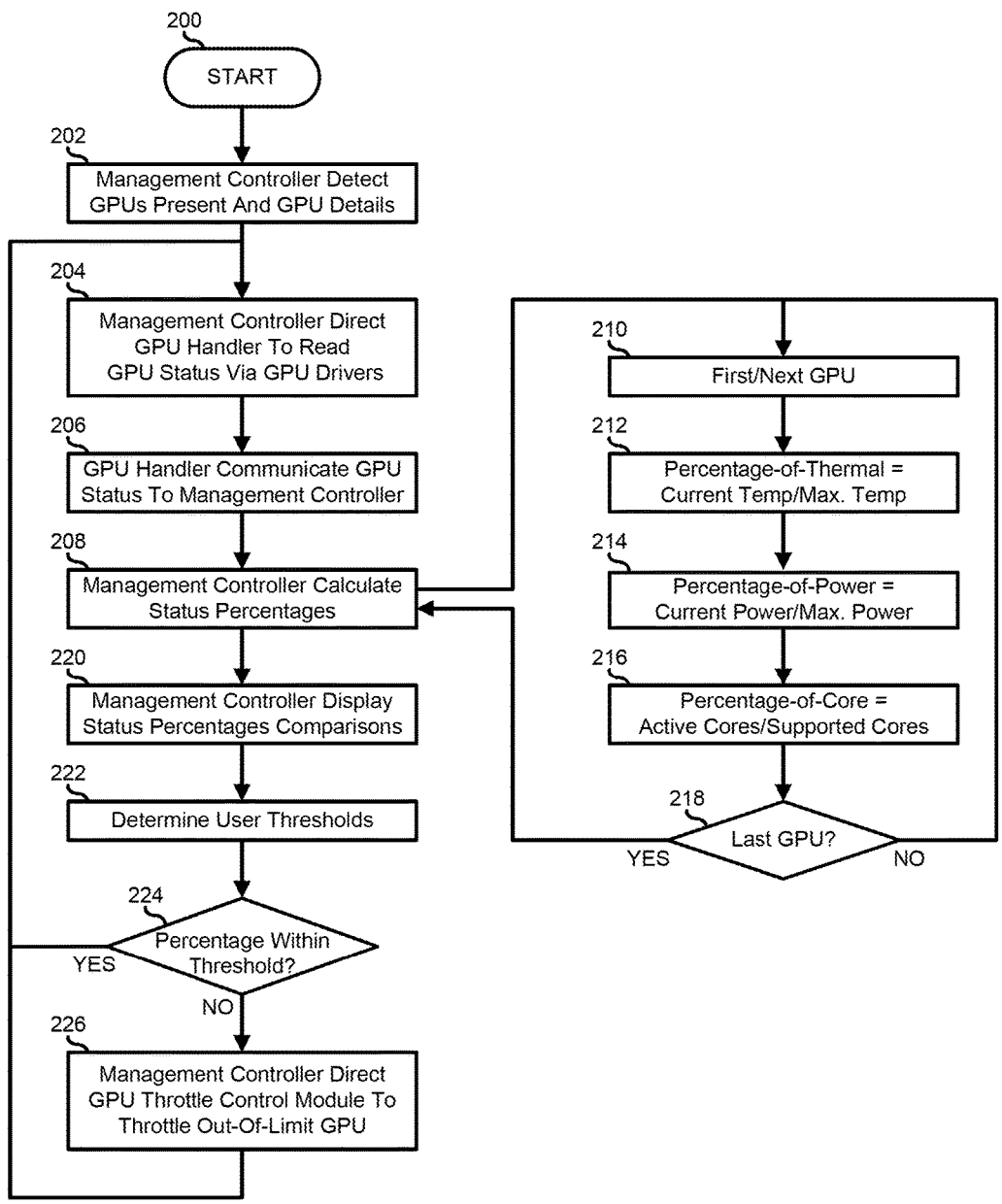
FIG. 2 is a flowchart illustrating a method of normalization of GPU workloads based on real-time GPU data according to an embodiment of the present disclosure.

FIG. 2 illustrates a method for normalization of GPU workloads based on real-time GPU data starting at block 200. A management controller of an information handling system detects the presence of one or more GPUs in the information handling system, and detects the details of any GPUs in the information handling system in block 202. For example, management controller 150 can direct GPU interface module 152 to detect GPUs 124 and 126 via out-of-band interface 118. Upon detection of the presence of the one or more GPU, the management controller directs a GPU handler to read the status of the one or more GPUs via associated GPU drivers in block 204. For example, management controller 150 can direct GPU interface module 152 to query GPU handler module 136 via interface 116 to determine the read status information from GPUs 124 and 126 via associated GPU drivers 140 and 142.

The GPU handler communicates the status information for the one or more GPUs to the management controller in block 206. The management controller calculates percentages for the various status information in block 208. In calculating the percentages, the management controller selects a first GPU in block 210, calculates a current thermal percentage for the selected GPU in block 212, calculates a current power percentage for the selected GPU in block 214, and calculates a current core utilization percentage for the selected GPU in block 216. The management controller makes a decision as to whether or not the selected GPU is the last GPU in decision block 218. If not, the "NO" branch of decision block 218 is taken and the method returns to block 210 where the next GPU is selected. If e selected GPU is the last GPU, the "YES" branch of decision block 218 is taken, indicating that the calculating of the percentages by the management controller of block 208 is completed.

The management controller displays the status percentages for a user to evaluate in block 220. For example, management controller 150 can communicate the status percentages to a management system connected to network interface 160. The management controller determines if user defined status thresholds are available in block 222, and a decision is made as to whether or not the status percentages are within the associated user defined status thresholds in decision block 224. If so, the "YES" branch of decision block 224 is taken and the method returns to block 204 where the management controller directs the GPU handler to read the status of the one or more GPUs. If one or more status percentages are not within the associated user defined status thresholds, the "NO" branch of decision block 224 is taken, the management controller directs a GPU throttle control module to throttle an out-of-threshold GPU in block 226, and the method returns to block 204 where the management controller directs the GPU handler to read the status of the one or more GPUs.

Figure 3:
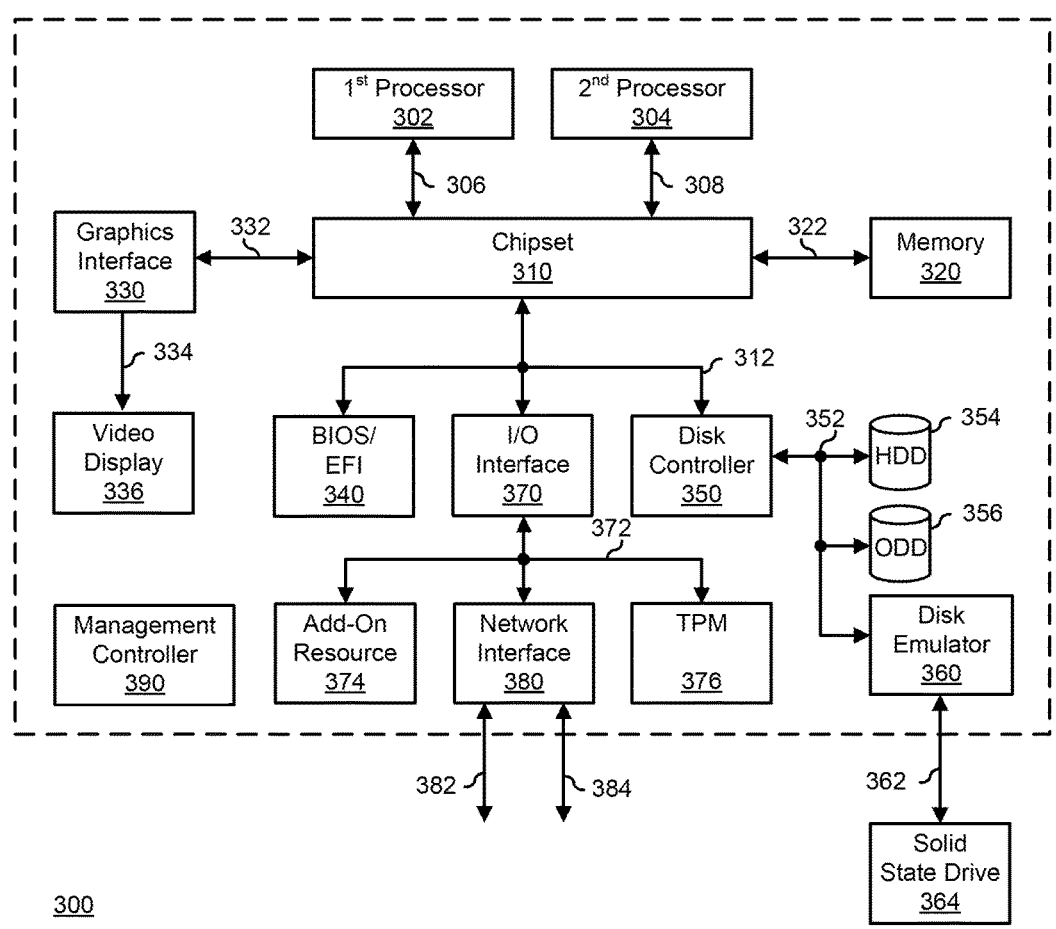
FIG. 3 is a block diagram illustrating a generalized information handling system according to an embodiment of the present disclosure.

FIG. 3 illustrates a generalized embodiment of information handling system 300. For purpose of this disclosure information handling system 300 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described above, and operates to perform one or more of the methods described above. Information handling system 300 includes a processors 302 and 304, a chipset 310, a memory 320, a graphics interface 330, a basic input and output system/extensible firmware interface (BIOS/EFI) module 340, a disk controller 350, a disk emulator 360, an input/output (I/O) interface 370, a network interface 380, and a management controller 390. Processor 302 is connected to chipset 310 via processor interface 306, and processor 304 is connected to the chipset via processor interface 308. Memory 320 is connected to chipset 310 via a memory bus 322. In a particular embodiment, information handling system 300 includes separate memories that are dedicated to each of processors 302 and 304 via separate memory interfaces. An example of memory 320 includes random access memory (RAM) such as static RAM (SRAM), dynamic RAM (DRAM), non-volatile RAM (NV-RAM), or the like, read only memory (ROM), another type of memory, or a combination thereof. Graphics interface 330 is connected to chipset 310 via a graphics interface 332, and provides a video display output 334 to a video display 336.

BIOS/EFI module 340, disk controller 350, and I/O interface 370 are connected to chipset 310 via an I/O channel 312. An example of I/O channel 312 includes a Peripheral Component Interconnect (PCI) interface, a PCI-Extended (PCI-X) interface, a high speed PCI-Express (PCIe) interface, another industry standard or proprietary communication interface, or a combination thereof. Chipset 310 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 340 includes BIOS/EFI code operable to detect resources within information handling system 300, to provide drivers for the resources, to initialize the resources, and to access the resources.

Disk controller 350 includes a disk interface 352 that connects the disc controller to a hard disk drive (HDD) 354, to an optical disk drive (ODD) 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits a solid-state drive 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O interface 370 includes a peripheral interface 372 that connects the I/O interface to an add-on resource 374, to a trusted platform module (TPM) 376, and to network interface 380. Peripheral interface 372 can be the same type of interface as I/O channel 312, or can be a different type of interface. As such, I/O interface 370 extends the capacity of I/O channel 312 when peripheral interface 372 and the I/O channel are of the same type, and the I/O interface translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof. TPM 376 can include a dedicated crypto-processor and secure storage, to ensure the integrity of information handling system 300 and to detect and prevent tampering with the operating firmware of the information handling system.

Network interface 380 represents a NIC disposed within information handling system 300, on a main circuit board of the information handling system, integrated onto another component such as chipset 310, in another suitable location, or a combination thereof. Network interface 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management controller 390 provides for out-of-band monitoring, management, and control of the respective components of information handling system 300, such as cooling fan speed control, power supply management, hot-swap and hot-plug management, firmware management and update management for system BIOS or UEFI, Option ROM, device firmware, and the like, or other system management and control functions as needed or desired. As such, management system 390 provides some or all of the functions and features of the management systems described herein.

Figure 4:
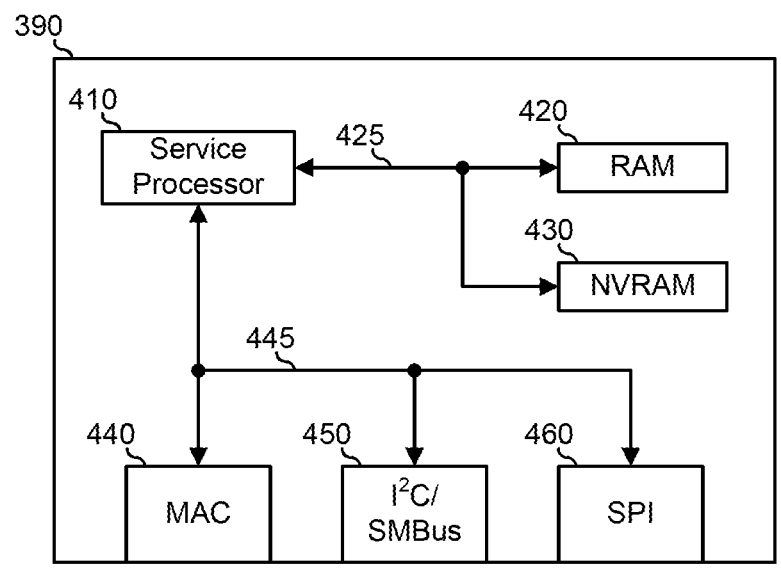
FIG. 4 is a block diagram illustrating an embodiment of a management system of the information handling system of FIG. 3.

FIG. 4 illustrates an embodiment of management system 390, including a service processor 410, a random-access memory (RAM) 420, an NVRAM 430, a media access control interface (MAC) 440, an I$^2$C/SMBus interface 450, and an SPI interface 460. RAM 420 and NVRAM 430 are connected to service processor 410 through a memory bus 425. MAC 440, I$^2$C/SMBus interface 450, and SPI interface 460 are connected to service processor 410 through an I/O bus 445. Management system 390 functions as a separate microcontroller system in information handling system 300, providing a dedicated management channel for maintenance and control of resources in the information handling system. As such, the resources in information handling system 300 are connected to one or more of I$^2$C/SMBus interface 450, and SPI interface 460, permitting management system 390 to receive information from or send information to the resources. A management system can be connected to management system 390 via MAC 440, thereby permitting the management system to receive information from or send information to the management system for out-of-band management of information handling system 300. An example of MAC 440 includes an Ethernet standard interface, such as a reduced media independent interface (RMII), a network communication service interface (NC-SI), another network standard interface, or any combination thereof.

In a particular embodiment, management system 390 is included on a main circuit board (such as a baseboard, a motherboard, or any combination thereof) of information handling system 300, integrated onto another element of the information handling system such as chipset 310, or another suitable element, as needed or desired. As such, management system 390 can be part of an integrated circuit or a chip set within information handling system 300. An example of management system 390 includes a baseboard management controller (BMC), an integrated Dell remote access controller (iDRAC), another controller, or any combination thereof. Management system 390 can also operate on a separate power plane from other resources in information handling system 300. Thus management system 390 can communicate with a management system while the resources of information handling system 300 are powered off. Here, information can be sent from the management system to management system 390 and the information is stored in RAM 420 or NVRAM 430. Information stored in RAM 420 may be lost after power-down of the power plane for management system 390, while information stored in NVRAM 430 may be saved through a power-down/power-up cycle of the power plane for the micro controller.

The preceding description in combination with the Figures is provided to assist in understanding the teachings disclosed herein. The preceding discussion focused on specific implementations and embodiments of the teachings. This focus has been provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
  a host processing system including:
    a main processor that instantiates a management controller agent;
    a first graphics processing unit (GPU);
    a second GPU; and
    a GPU throttle module; and
  a baseboard management controller that:
    accesses the management controller agent via a first interface to obtain a first performance status from the first GPU and a second performance status from the second GPU, wherein the first interface is a keyboard controller style interface;
compares the first performance status with the second performance status;
determines whether or not to direct the GPU throttle module to throttle the first GPU based upon the comparison; and
directs, via a second interface of the information handling system, the GPU throttle module to throttle the first GPU when it is determined to direct the GPU throttle module to throttle the first GPU, wherein the second interface operates out-of-band from the host processing system.

2. The information handling system of claim 1, wherein in throttling the GPU, the GPU throttle module asserts a control signal to the first GPU.

3. The information handling system of claim 2, wherein the control signal causes the first GPU to slow its operation.

4. The information handling system of claim 3, wherein the first GPU slows its operation by reducing an internal clock frequency of the first GPU.

5. The information handling system of claim 3, wherein the first GPU throttle module asserts the control signal in accordance with a pulse width modulation scheme.

6. The information handling system of claim 5, wherein the first GPU slows its operation in proportion with a pulse width of the control signal.

7. The information handling system of claim 1, wherein the first performance status comprises a temperature of the first GPU.

8. The information handling system of claim 1, wherein the first performance status comprises a power consumption of the first GPU.

9. The information handling system of claim 1, wherein the first performance status comprises a memory utilization of the first GPU.

10. The information handling system of claim 1, wherein the first performance status comprises an I/O bandwidth utilization of the first GPU.

11. A method, comprising:
accessing, by a baseboard management controller of an information handling system, a management controller agent instantiated by a main processor of the information handling system to obtain a first performance status from a first graphics processing unit (GPU) of the information handling system and to obtain a second performance status from a second GPU of the information handling system, wherein the management controller is accessed by the baseboard management controller via a first interface, and wherein the first interface is a Universal Serial Bus Network Interface Card (USB-NIC) interface;
comparing, by the baseboard management controller, the first performance with the second performance status;
determining, by the baseboard management controller, whether or not to direct the GPU throttle module to throttle the first GPU based upon the comparison; and
directing, via a second interface of the information handling system, a GPU throttle module of the information handling system to throttle the first GPU when it is determined to direct the GPU throttle module to throttle the first GPU, wherein the second interface operates out-of-band from the host processing system.

12. The method of claim 11, wherein in throttling the first GPU, the method further comprises:
asserting, by the GPU throttle module, a control signal to the first GPU.

13. The method of claim 12, further comprising:
slowing the operation of the first GPU in response to the asserted control signal.

14. The method of claim 13, in slowing the operation of the first GPU, the method further comprises:
reducing an internal clock frequency of the first GPU.

15. The method of claim 13, wherein the GPU throttle module asserts the control signal in accordance with a pulse width modulation scheme.

16. A non-transitory computer-readable medium including code for performing a method, the method comprising:
accessing, by a baseboard management controller of an information handling system, a management controller agent instantiated by a main processor of the information handling system to obtain a first performance status from a first graphics processing unit (GPU) of the information handling system and to obtain a second performance status from a second GPU of the information handling system, wherein the management controller is accessed by the baseboard management controller via a first interface, and wherein the first interface is a Universal Serial Bus Network Interface Card (USB-NIC) interface;
comparing, by the baseboard management controller, the first performance status with the second performance status;
determining, by the baseboard management controller, whether or not to direct the GPU throttle module to throttle the first GPU based upon the comparison; and
directing, via a second interface of the information handling system, a GPU throttle module of the information handling system to throttle the first GPU when it is determined to direct the GPU throttle module to throttle the first GPU, wherein the second interface is an interface that operates out-of-band from the host processing system.

17. The computer-readable medium of claim 16, wherein in throttling the first GPU, the method further comprises:
asserting, by the GPU throttle module, a control signal to the first GPU.

18. The computer-readable medium of claim 17, the method further comprising:
slowing the operation of the first GPU in response to the asserted control signal.

19. The computer-readable medium of claim 18, in slowing the operation of the first GPU, the method further comprises:
reducing an internal clock frequency of the first GPU.

20. The computer-readable medium of claim 18, wherein the GPU throttle module asserts the control signal in accordance with a pulse width modulation scheme.

* * * * *